March 17, 1959 D. D. HOLMES 2,878,384

ANGLE MODULATION DETECTOR

Filed Oct. 26, 1954 2 Sheets-Sheet 1

INVENTOR.
DAVID D. HOLMES

BY H. D. Newton

ATTORNEY

INVENTOR.
DAVID D. HOLMES
BY H. L. Newton
ATTORNEY 2,878,384

ANGLE MODULATION DETECTOR

David D. Holmes, Princeton, N. J., assignor to Radio Corporation of America, a corporation of Delaware Application October 26, 1954, Serial No. 464,731

2 Claims. (Cl. 250—31)

The present invention relates generally to detectors of angle modulated carrier waves and more particularly to circuits utilizing semiconductor devices for deriving the modulation from a frequency modulated or phase modulated carrier wave.

By angle modulation it is meant either frequency modulation, phase modulation or hybrid forms of modulation possessing characteristics common to both of them.

In the past there have been provided various methods of detecting angle modulated carrier waves. Among these was the utilization of crystal diodes which were small in size, required low power consumption, and contributed only to a small extent to the overall noise in the circuit. However, crystal diodes could not be utilized to provide amplification concurrently with detection.

Electron discharge devices on the other hand have been used to provide detection and amplification at the same time. However, such devices were large in size, consumed considerable power, and added appreciably to circuit noise.

Another problem encountered in the utilization of electron discharge devices is the problem of coupling. In view of the fact that electron discharge devices are of only one conductivity type, single-ended coupling cannot be provided in a balanced arrangement without resort to transformers or phase inverters to provide a balanced input signal.

It is, of course, possible with appropriate circuit modifications to utilize semiconductor devices such as transistors in the conventional types of angle modulation detector circuits above discussed. However, as in the case of the utilization of electron discharge devices, it is found that certain coupling problems are encountered.

Furthermore, in many applications it may be found desirable to use signal amplifier circuits employing the complementary symmetry principle. Accordingly, it becomes highly desirable that the remaining circuits which are utilized in the receiving system take advantage of the complementary symmetry principle due to the great simplification of coupling arising therefrom.

Accordingly, it is an object of the present invention to provide a simple detector of angle modulated carrier waves utilizing a pair of semiconductor devices of opposite conductivity types.

It is another object of the present invention to provide a simple detector of angle modulated carrier waves utilizing a pair of semiconductor devices of opposite conductivity types which requires a minimum of components to provide efficient coupling with other stages and which improves the operation of frequency modulation receiving systems.

It is a still further object of the present invention to provide a frequency modulation or other angle modulation detector circuit utilizing a pair of semiconductor devices of opposite conductivity types to concurrently provide limiting, detection, and amplification.

In accordance with the present invention a pair of semiconductor devices of opposite conductivity types are arranged in series for direct currents and in parallel for signal currents. A frequency modulated carrier wave is applied simultaneously between like input electrodes of the devices and in quadrature phase relation between the input and common electrodes of each of the devices. The input signal current of the respective devices therefore will vary in opposite sense but in the same amount with a variation in the frequency of the input signal. An output signal which represents the modulation signal of the frequency modulated carrier wave may be derived from a load network coupled between the output electrodes of the two devices and a point common with the input circuit.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
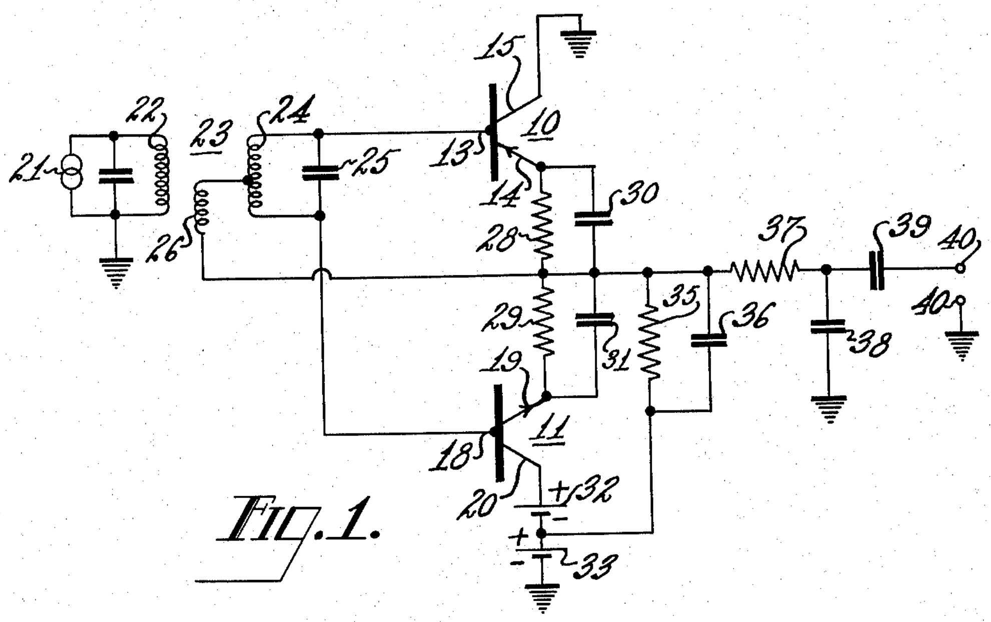
Figure 1 is a schematic circuit diagram of an angle modulation detector circuit provided in accordance with the present invention.

Referring now to the drawing in which like elements have been designated by the same reference character throughout the various figures, and in particular to Figure 1, a pair of semiconductor devices are illustrated as junction transistors 10 and 11 of opposite conductivity types. The transistor 10 may be of either conductivity type, but is illustrated in Figure 1 as a PNP junction transistor which includes a base electrode 13, an emitter electrode 14 and a collector electrode 15. The transistor 11 also may be of either conductivity type, but must be of opposite conductivity type to the transistor 10 and is accordingly illustrated as an NPN junction transistor including a base electrode 18, an emitter electrode 19 and a collector electrode 20.

Input signals from any convenient source 21 of frequency modulated carrier wave energy may be applied to the tuned primary winding 22 of phase detector transformer 23. The transformer 23 further includes a secondary winding 24 which is tuned in a conventional manner to the carrier wave frequency by a parallel connected capacitor 25, and the end terminals of the secondary winding 24 are connected respectively to the base electrodes 13 and 18.

The input circuit for each of the transistors 10 and 11 is completed by a tertiary winding 26 which is tightly coupled to the primary winding 22 and is connected between the electrical center of the secondary winding 24 and the emitter electrodes 14 and 19 through a pair of emitter resistors 28 and 29. It will be noted that the transistors 10 and 11 are operated with near zero bias to provide rectification of the signal in the base to emitter path. Each of the emitter resistors 28 and 29 may be bypassed at the carrier wave frequency by the shunt connected capacitors 30 and 31.

Resistors 28 and 29 provide a degree of stability and a means for alignment and balancing of the two transistors, but are not essential to the operation of the circuit.

Bias for each of the transistors may be provided from any convenient source of center-tapped direct current bias, illustrated as a pair of batteries 32 and 33, connected in series arrangement between the collector electrode 20 and a point of fixed reference potential, such as signal ground. The output circuit and the bias circuit for the transistor 10 is completed by connecting the collector electrode 15 directly to signal ground.

Output signals which represent an amplified replica of the modulation wave may be derived across a load impedance element, illustrated as a load resistor 35, connected between the junction of the two batteries 32 and 33 and the junction of the two bypass capacitors 30 and 31. The load resistor 35 may be bypassed at carrier wave signal frequencies by a shunt connected capacitor 36. A de-emphasis network comprising a series connected resistor 37, a shunt capacitor 38 and a coupling capacitor 39 is connected between the ungrounded end of the load resistor 35 and one of a pair of output terminals 40.

It may readily be seen that the signal voltage which is developed across the secondary winding 24 is in quadrature phase relation with the signal voltage which is developed across the tertiary winding 26. The net signal voltage which will accordingly be applied between the base electrode 13 and 18 and their respective emitter electrodes 14 and 19 will be determined by the vector sum of these two signal voltages as is conventional in angle modulation detector systems. The tuned circuit which comprises the secondary winding 24 and the capacitor 25 is tuned to the carrier wave frequency. Accordingly, when a frequency modulated carrier wave is impressed upon the input circuit the actual phase relation between the two input signal voltages will be determined by the instantaneous frequency of the carrier wave. Variations in the frequency of the modulater carrier wave will result in an increase in the instantaneous signal voltage appearing between the base electrode and the respective emitter electrode of one of the transistors and a decrease in the instantaneous signal voltage appearing between the base electrode and the respective emitter electrode of the other transistor. This will result in a variation in the input signal current of the two devices in an opposite sense but of an equal magnitude.

It is to be noted that if it is assumed that the two transistors 10 and 11 have substantially equal but opposite characteristics, a zero signal condition will result in a constant direct current flowing from the battery 32 through the transistor 11, the emitter resistors 29 and 28, the transistor 10 and back to the battery 33. If there is any unbalance between the two transistors 10 and 11, the differential current will flow through the load resistor 35, but this differential current will be reduced by the degenerative effect of the emitter resistor connected with the transistor which tends to conduct more readily than the other.

It now may be seen that the effect of a frequency modulated carrier wave will be to alter the conductivity of the two transistors in an equal but opposite amount so as to provide an amplified signal current through the load resistor 35 which will be determined in a magnitude by the extent of frequency deviation of the modulated carrier wave from the carrier wave center frequency. The signal current flowing through the load resistor 35 therefore represents the modulation signal which has been derived from the frequency modulated carrier wave. It is to be noted that the amplitude of this signal will be dependent upon the amplitude of the impressed carrier wave and accordingly it is preferred that this embodiment of the present invention be utilized with a limiter circuit preceding it in a receiving system.

Figure 2:
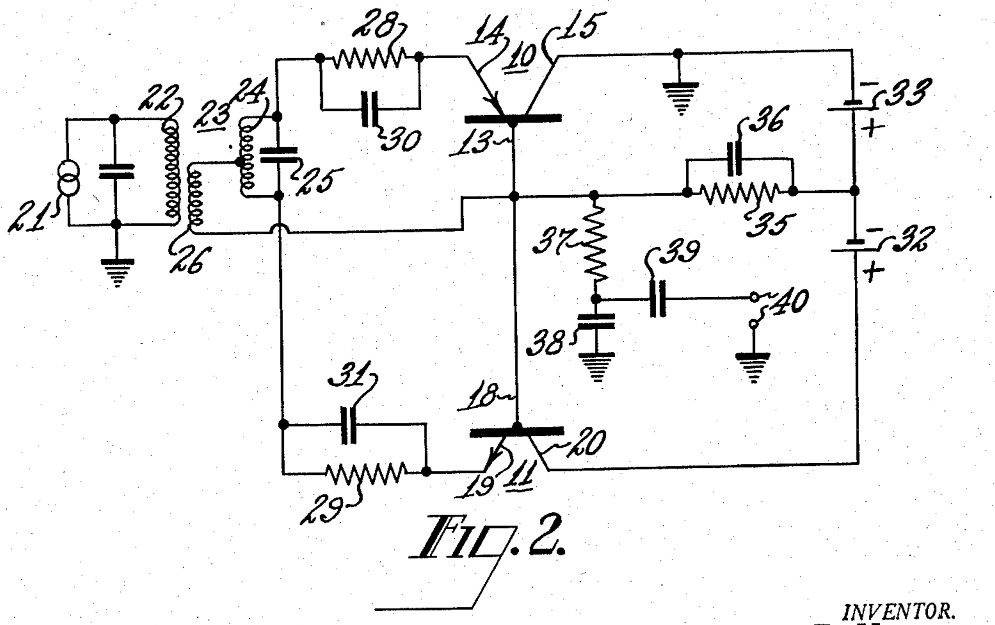
Figure 2 is a schematic circuit diagram illustrating a further embodiment of the invention illustrated in Figure 1.

The embodiment of the invention illustrated in Figure 2 is substantially identical with the embodiment of the invention illustrated in Figure 1 except that the transistors 10 and 11 are arranged in a common base configuration wherein the end terminals of the secondary winding 24 are connected to the emitter electrodes 14 and 19 instead of to the base electrodes 13 and 18.

The operation of the embodiment of the invention illustrated in Figure 2 is also substantially identical with the embodiment illustrated in Figure 1, except that the characteristics of the input transformer may in some cases have to be altered or modified to accommodate the different input characteristics of the transistors which may be encountered in a common base configuration as distinguished from those which may be encountered in a common emitter configuration. It is also to be noted that in this particular embodiment the emitter electrode current of the two transistors flows through the secondary winding 24 and may effect the characteristics due to loading. In other aspects the operation of this circuit is identical with the operation above discussed in connection with Figure 1.

It was above noted that each of the circuits illustrated in Figures 1 and 2 is amplitude sensitive, that is, the amplitude of the output signal is dependent upon the frequency deviation of the input carrier wave and is also dependent upon the amplitude of the input carrier wave. A further embodiment of the invention, which may be considered somewhat analogous to a ratio detector circuit in that it is essentially amplitude insensitive, is illustrated in Figure 3.

Figure 3:
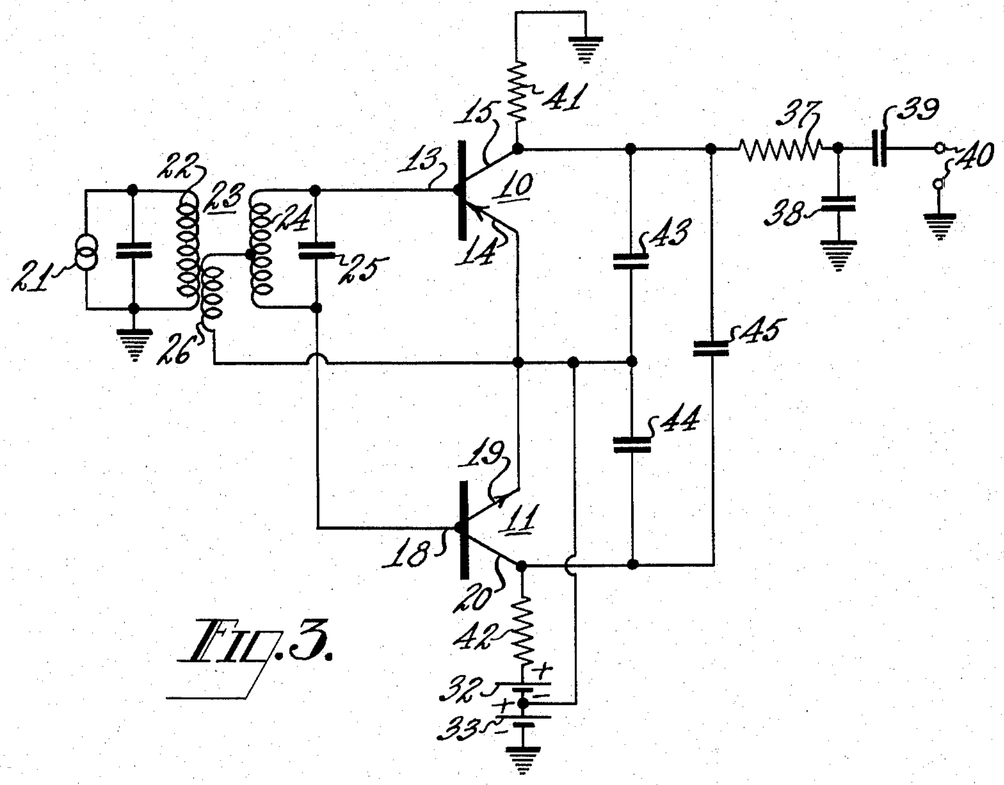
Figure 3 is a schematic circuit diagram illustrating still another embodiment of the present invention.

The input circuit in the embodiment illustrated in Figure 3 is substantially identical with the input circuit illustrated in the embodiment of Figure 1. The output circuit comprises a direct current conductive load impedance element, illustrated as a first load resistor 41, connected between the collector electrode 15 and signal ground and a second direct current conductive load impedance element, illustrated as a second load resistor 42, connected in series with the batteries 32 and 33 between the collector electrode 20 and signal ground. A pair of carrier wave bypass capacitors 43 and 44 are connected respectively in shunt with the two transistors 10 and 11, and the collector electrodes 15 and 20 are coupled together at the output signal frequency by a relatively large coupling capacitor 45.

Output signals may accordingly be derived from either of the collector electrodes 15 or 20, or from the junction of the bypass capacitors 43 and 44. A de-emphasis network is shown for the purpose of illustration only as comprising a resistor 37 connected in series with a capacitor 38 between the collector electrode 15 and signal ground. A coupling capacitor 39 is connected between the junction of the capacitor 38 and the resistor 37 and one of a pair of output terminals 40 the other of which is connected directly to signal ground.

It may now be seen that the output signal representing an amplified replica of the carrier wave modulation signal may be derived in the manner above discussed from across either of the carrier wave bypass capacitors 43 and 44. However, in view of the fact that the two transistors 10 and 11 are of opposite conductivity types it is seen that the voltage which exists between the collector electrode 15 and the collector electrode 20 will be determined by the instantaneous amplitude of the impressed carrier wave or if the time constant determined by the two transistors 10 and 11 and the capacitor 45 is sufficiently long, the voltage between the two collector electrodes 15 and 20 will be determined by the average amplitude of the impressed carrier wave.

The output signal which is derived from across either of the capacitors 43 and 44 will then be determined by the ratio of the voltages existing across the two respectively. In view of the fact that these two voltages are in additive relation to provide the total voltage which exists between the two collector electrodes 15 and 20, the output signal which is derived from this embodiment of the invention is accordingly insensitive to amplitude variations of the input carrier wave and the use of a previous limiter stage is not required.

Figure 4:
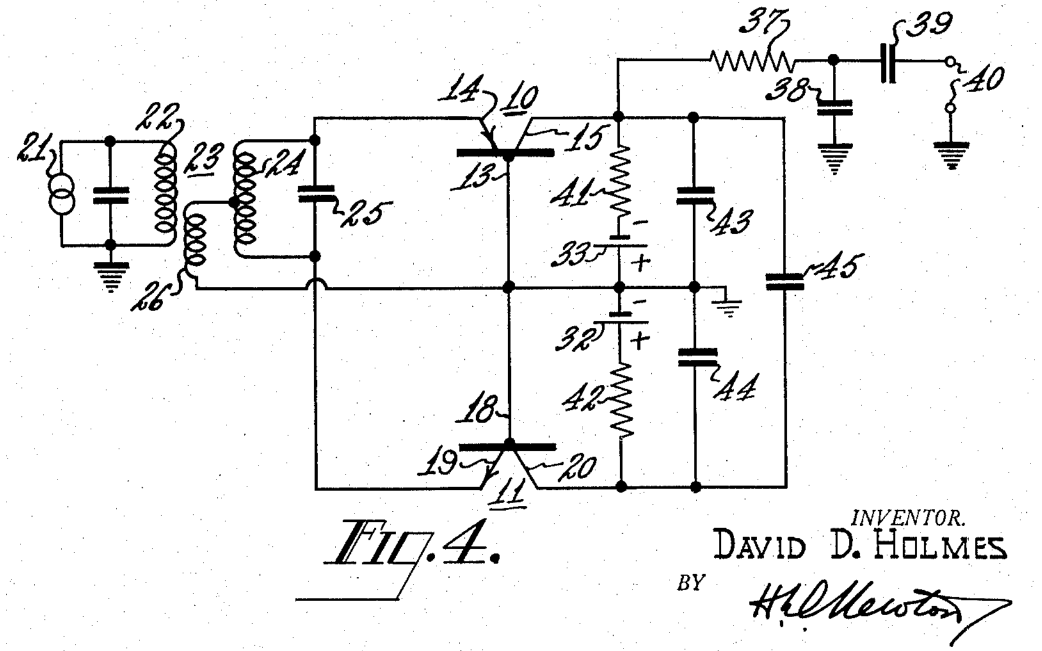
Figure 4 is a schematic circuit diagram illustrating a further embodiment of the present invention which is a modification of the embodiment illustrated in Figure 3.

The embodiment of the invention illustrated in Figure 4 is substantially identical with the embodiment of the invention illustrated in Figure 3 except that the two transistors 10 and 11 are utilized in a common base configuration. The operation of the circuit is substantially identical with the operation above discussed in connection with Figure 3. However, as above noted in connection with Figure 2, the characteristics of the input transformer may be slightly different from the characteristics required with the common emitter configuration and the effect of the emitter electrode current flowing through the secondary winding 24 may have to be considered in transformer design.

The output signal which may be derived from this circuit represents an amplified replica of the carrier wave modulation signal and is not sensitive to amplitude variations of the carrier wave.

It is therefore seen that an angle modulation detector circuit as provided in accordance with the present invention enables efficient operation to demodulate a carrier wave which has been modulated in frequency or in phase while providing signal amplification with a minimum of circuit elements. The output signal may be made insensitive to amplitude variations of the input carrier wave and may be derived with a minimum of circuit elements with all of the attendant advantages.

What is claimed is:

1. An angle modulation detector circuit for deriving from angle modulated signal waves a demodulated output signal having a relative magnitude dependent upon the angular modulation of said waves and comprising in combination; a pair of semiconductor devices of opposite conductivity types, each including input, collector and common electrodes; an input circuit comprising an input transformer including a tuned primary winding, a tuned secondary winding, and a tertiary winding; said secondary winding being connected between said input electrodes; said tertiary winding being connected between said common electrodes and the electrical center of said secondary winding; a first load impedance element and a first source of direct current bias connected in series arrangement between the collector electrode of one of said pair of devices and said common electrodes; a second load impedance element and a second source of direct current bias connected in series arrangement between the collector electrode of the other of said pair of devices and said common electrodes; a storage capacitor connected between said collector electrodes; and a signal output circuit connected with one of said load impedance elements for deriving therefrom said output signal.

2. An angle modulation detector circuit for deriving from angle modulated signal waves a demodulated output signal having a magnitude dependent upon the angular modulation of said waves and comprising in combination; a pair of semiconductor devices of opposite conductivity types, each including base, collector and emitter electrodes; an input circuit comprising an input transformer including a tuned primary winding, a tuned secondary winding, and a tertiary winding; said secondary winding being connected between said base electrodes; said tertiary winding being connected between said emitter electrodes and the electrical center of said secondary winding; a first load resistor and a first source of direct current bias connected in series arrangement between the collector electrode of one of said pair of devices and said emitter electrodes; a first signal wave bypass capacitor connected in shunt with the series arrangement of said first load resistor and said first source of direct current bias; a second load impedance element and a second source of direct current bias connected in series arrangement between the collector electrode of the other of said pair of devices and said emitter electrodes; a second signal wave bypass capacitor connected in shunt with the series arrangement of said second load resistor and said second source of direct current bias; a storage capacitor connected between said collector electrodes; and a signal output circuit connected across one of said signal wave bypass capacitors for deriving therefrom the demodulated output signal.

References Cited in the file of this patent

UNITED STATES PATENTS

| | | |
|---|---|---|
| 2,634,369 | Swanson et al. | Apr. 7, 1953 |
| 2,644,084 | O'Brien | June 30, 1953 |
| 2,666,819 | Raisbeck | Jan. 19, 1954 |
| 2,698,392 | Herman | Dec. 28, 1954 |
| 2,710,350 | Van Dykum | June 7, 1955 |
| 2,764,687 | Buchanan et al. | Sept. 25, 1956 |

FOREIGN PATENTS

| | | |
|---|---|---|
| 524,721 | Belgium | May 31, 1954 |

OTHER REFERENCES

Proceedings of the I. R. E., June 1953 pp. 717, 719.